Dec. 27, 1932. R. L. JENKINS ET AL 1,892,400
DIPHENYL RESIN AND METHOD OF PRODUCING THE SAME
Filed April 23, 1930   2 Sheets-Sheet 1

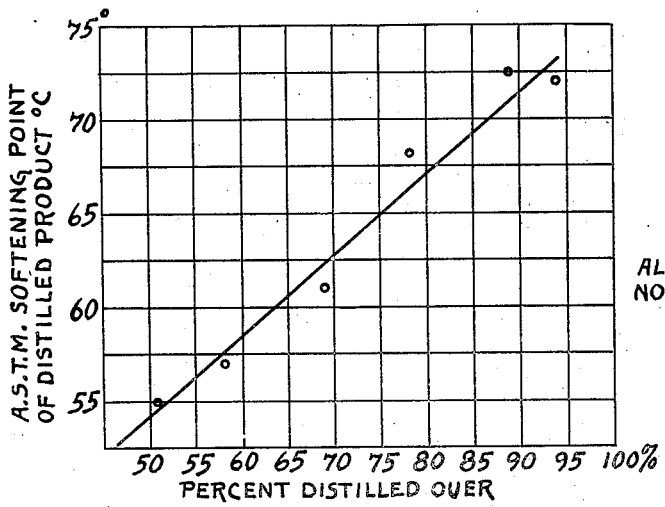

Fig. 1

ALL SAMPLES NONCRYSTALLINE

{40% DISTILLED HIGH BOILING COMPOUNDS
 60% TECHNICAL DIPHENYL} CHLORINATED TO 63.47% CHLORINE
INITIAL SOFTENING POINT = 78.5°C

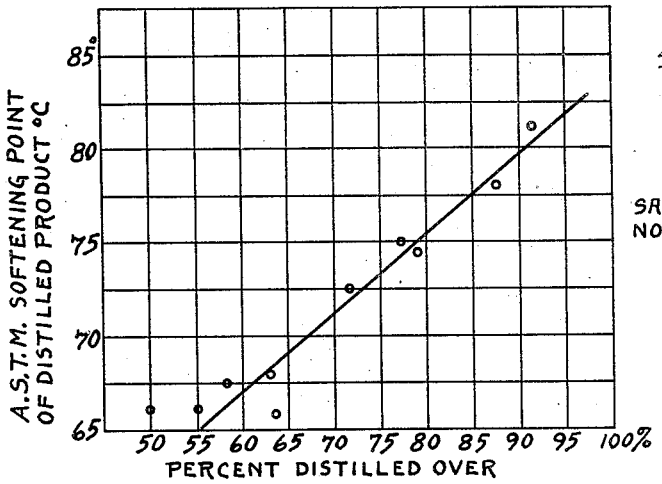

Fig. 2

SAMPLES ABOVE 64% NONCRYSTALLINE

{40% DISTILLED HIGH BOILING COMPOUNDS
 60% TECHNICAL DIPHENYL} CHLORINATED TO 64.81% CHLORINE
INITIAL SOFTENING POINT = 86°C

INVENTORS
R. L. Jenkins
J. A. Sikarski
BY
ATTORNEYS

WITNESS

Dec. 27, 1932.  R. L. JENKINS ET AL  1,892,400
DIPHENYL RESIN AND METHOD OF PRODUCING THE SAME
Filed April 23, 1930   2 Sheets-Sheet 2

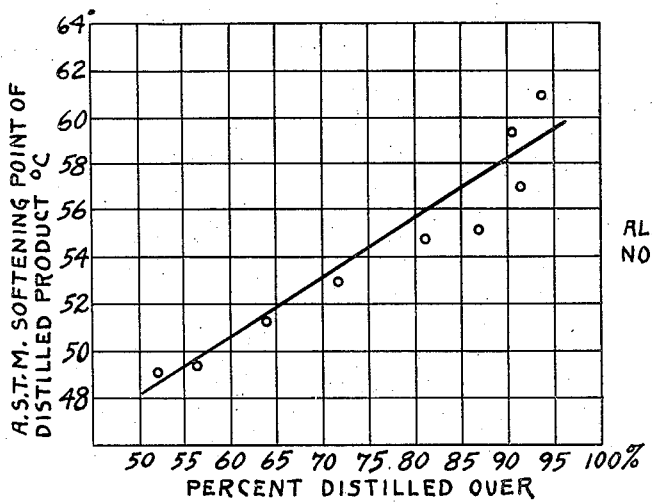

Fig. 3

ALL SAMPLES NONCRYSTALLINE

{20% DISTILLED HIGH BOILING COMPOUNDS}
{80% TECHNICAL DIPHENYL} CHLORINATED TO 63.47% CHLORINE
INITIAL SOFTENING POINT = 67°C

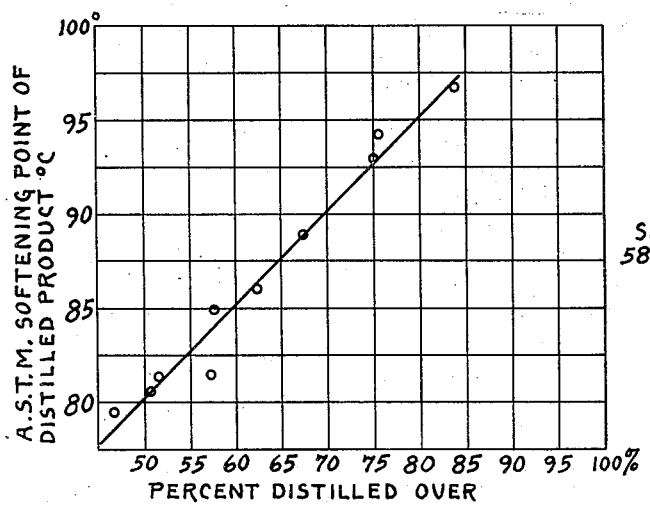

Fig. 4

SAMPLES ABOVE 58% CRYSTALLINE

{32% DISTILLED HIGH BOILING COMPOUNDS}
{8% STILL BOTTOMS}
{60% TECHNICAL DIPHENYL} CHLORINATED TO 64.79% CHLORINE
INITIAL SOFTENING POINT 102°C

INVENTORS
R. L. Jenkins
J. A. Sikarski
BY
Johnston & Jennings
ATTORNEYS

WITNESS
Charles H. Bassett

Patented Dec. 27, 1932

1,892,400

UNITED STATES PATENT OFFICE

RUSSELL L. JENKINS AND JOSEPH A. SIKARSKI, OF ANNISTON, ALABAMA, ASSIGNORS TO SWANN RESEARCH, INCORPORATED, A CORPORATION OF ALABAMA

DIPHENYL RESIN AND METHOD OF PRODUCING THE SAME

Application filed April 23, 1930. Serial No. 446,434.

This invention relates to diphenyl resins, and in particular to a process by which resins having predetermined properties may be produced.

Prior to the time of the discovery of the many synthetic resins which are now known, it was thought that all resins were of botanical origin. Hence, the terminology used even today in the field of resins is still considerably influenced by this fact. In fact, it may be pointed out that in the early days of synthetic resins these bodies were considered the antithesis of pure compounds which are usually crystalline and have sharp melting points. (See Ellis—Synthetic Resins and Their Plastics, p. 17.) Consequently, it came to be understood that synthetic resins while differing in many respects from the natural resins should still be considered as non-crystalline bodies as were the natural resins.

In our study of the chlorinated diphenyl compounds, we have found that bodies could be built by only slight variations of the process which would yield crystalline or non-crystalline bodies at will. Furthermore, in those cases where bodies were formed, which were on the borderline between the crystalline and non-crystalline fields, it was extremely difficult to distinguish between the two states, due undoubtedly to the complex character of the molecules involved and the weak crystallizing forces which the materials possessed.

Because of the difficulties above mentioned, and also because of the fact that many of the materials obtained by our process are definitely crystalline, or possess characteristics indicating the presence of crystalline, as well as non-crystalline bodies, lacking, however, the sharp melting point of pure crystalline bodies, we desire for the purpose of this specification to broaden the accepted meaning of the term "resin" to include both crystalline and non-crystalline bodies.

We are dealing herein with chlorinated diphenyl, or with complex chlorinated diaryl bodies related to diphenyl, or mixtures of these bodies, and in particular with bodies which contain mixtures of various isomers of the several possible pure compounds of different chlorine content. We believe it is this complexity of the bodies produced by our process which gives to these bodies the resin-like properties which will hereinafter be more fully described.

Previously known methods of producing chlorinated diphenyl or related diaryl resins are described in our previous application, Serial No. 395,741, filed September 27, 1929. This process consists in chlorinating mixtures of diphenyl and related diaryls in the presence of iodine as a catalyst. In the practical carrying out of this operation, we have found that it is necessary to avoid contact of the reacting mass with most metals, particularly with metals of the iron group, consequently the chlorination must be carried out in glass or ceramic vessels. These are subject to breakage, either through mechanical or thermal shock with consequent loss of product and interrupted production. Furthermore, the product of this operation is of a distinctly deep yellow to orange color, and consequently is only of limited use where color is important as in varnish resins. In contradistinction to this, the product obtained by our present process ranges from light yellow to water white in color, and consequently has found important fields of usefulness in varnishes, lacquers and emulsions, and in the electrical arts.

The physical properties of the products of this process which may be predetermined vary from viscous oils through solid resinous compounds to high melting point crystalline or semi-crystalline bodies. The material used in the production of these resinous bodies is a product of the diphenyl production operation when diphenyl is produced by thermal synthesis.

In the production of diphenyl by thermal synthesis, preheated benzol vapors are pumped through a bath of a molten salt or molten metal, such as lead, said bath being maintained at the diphenyl forming temperature, which is in the neighborhood of 850° C. A considerable part of the benzol is decomposed at this temperature, forming diphenyl and related diaryls. The total yield of vapor from such a converter is condensed and the product distilled in an efficient fractionating column. The first fraction on distillation is mainly unconverted benzol boiling in the neighborhood of 80° C. When most of the benzol has been distilled over, the temperature rises sharply. When the temperature of the vapor reaches 250° C., the receiver is changed and distillation continued until a vapor temperature of 270° C. is reached. This fraction is known as the technical diphenyl fraction. The product now remaining in the distillation flask consists of complex high boiling compounds chemically related to diphenyl, in that they probably consist of various diaryls or substituted diaryls. Part of this product is distillable, and part cannot be distilled at atmospheric pressure without decomposition. If it is desired to separate the complex high boiling compounds, distillation is continued at atmospheric pressure until a temperature in the neighborhood of 400 to 420° C. is reached. The distillate is known as distilled high boiling compound, while the residue in the flask is known as still bottoms. For the purpose of this application, the following terminology is herewith adopted to designate the various classes of materials obtained.

*Table I*

| Fraction | Boiling range of fraction | Name of product |
| --- | --- | --- |
| 1 | 250°–270° C. | Technical diphenyl. |
| 2 | 270°–400° C. | Distilled high-boiling compounds. |
| 3 | Above 400° C. and undistillable at atmospheric pressure. | Still bottoms. |

It should be understood that the temperature ranges given are approximate and may be varied somewhat without materially changing the character of the product. It is also to be understood that the products of such a distillation as here described, while of substantially reproducible composition, are not pure compounds as this term is usually understood in chemistry. Especially is this true of the last two fractions in the above table. In the case of the technical diphenyl fraction, we obtain a body which is probably made up of from 96 to 99% of the substance diphenyl $C_6H_5$—$C_6H_5$ with 1 to 4% of the next higher boiling fraction mixed with it. The purity of the technical diphenyl will vary with the efficiency of the fractionating column employed, and although we may obtain and thus employ in our resin process a much higher purity of diphenyl than that described above, we prefer to use what we have designated above as technical diphenyl, since this is more cheaply and easily obtained. It is very difficult with the present state of our knowledge to describe completely the chemical nature of the high boiling compounds included in Fractions 2 and 3, Table 1. They are undoubtedly derivatives of diphenyl in which compound aromatic groups of various types are substituted. These aromatic groups may be the phenyl group, the phenyl-phenyl group, the phenylene group, diphenylene group, or possibly more complicated groups. For the sake of convenience, they may be referred to collectively as aryl substituted diphenyls. Since diphenyl is a diaryl, the term diaryl will be used to designate generally diphenyl and related diaryls.

The only difference between Fractions 2 and 3 we believe is that the latter fraction is considerably more complex than the former. Hence, in distinguishing between Fractions 2 and 3, we will refer to the former as distilled high boiling compounds, while the latter fraction will be designated as undistilled high boiling compounds, or simply as still bottoms.

Our process for the utilization of the above mentioned bodies in the production of chlorinated resins will be described by means of a series of examples which are designed to make clear the application of our new process to the production of resins, and by the accompanying drawing setting forth grapically in Figs. 1 to 4, the relations between initial bodies employed, chlorine content thereof, and the resulting nature of the product obtained.

*Example I*

Place 10 pounds of molten technical diphenyl (Fraction 1 of Table 1) in an iron chlorinator and chlorinate by passing chlorine gas through an iron or other suitable catalyst submerged in the diphenyl, until the mixture has reached a specific gravity of 1.37 at 65° C., referred to water at 65° C. The chlorine content will be in the neighborhood of 43%. At this stage the product, if an iron catalyst is employed, is a black oil having a Saybolt viscosity of approximately 36 seconds at 210° F. This oil is now distilled without reflux until approximately 95 to 98% of the product has been distilled. The distillation range is 295° to 345° C. (uncorr.) at atmospheric pressure. The product is a light yellow to water-white oil having a density of 1.36 at 65° C./65° C., and a Saybolt viscosity of 35–36 seconds at 210° F.

While chlorination is preferably carried out in iron vessels, using iron as a catalyst, other catalysts, such as aluminum chloride, sulphur chloride or antimony pentachloride may be used with equally successful results.

*Example II*

Place 10 pounds of molten technical diphenyl (Fraction 1 of Table 1) in an iron chlorinator and chlorinate as described in Example 1 above, until the mixture has reached a specific gravity of 1.53 at 65° C./65° C. The product at this stage is a black oil having a chlorine content of approximately 54.5% and has a Saybolt viscosity of 55 seconds at 210° F. This oil is now distilled without reflux either at atmospheric pressure or under reduced pressure until approximately 90 to 95% of the product has been distilled. The distillation range is from 350° to 380° C. (uncorr.) at atmospheric pressure. The distillate is a light yellow to water white oil, having a density of 1.52 at 65° C./65° C., and a Saybolt viscosity of 47 seconds at 212° F.

*Example III*

Place 10 pounds of molten technical diphenyl (Fraction 1) in an iron chlorinator and chlorinate as described in Example 1 above until the mixture has reached a specific gravity of 1.65 at 65° C./65° C. The product at this stage is a black solid having a chlorine content of approximately 63% and A. S. T. M. softening point for asphalt and pitches in the neighborhood of 50° C. This material is now distilled without reflux either at atmospheric pressure or under reduced pressure until approximately 93% of the material has distilled. The temperature of distillation is between 374° and 410° C. (uncorr.) at atmospheric pressure. The density of the distillate is 1.63 at 65° C./65° C. It is a soft, sticky yellow to colorless wax, having a Saybolt viscosity above 127 seconds at 210° F.

*Example IV*

Place 10 pounds of molten technical diphenyl (Fraction 1) in an iron chlorinator and chlorinate as described in Example 1 above, until the mixture has attained a chlorine content of approximately 68 per cent. Since this material is a crystalline solid at ordinary temperatures, the usual A. S. T. M. softening point cannot be used to follow the chlorination, but it can be analyzed directly for chlorine. The product at this point although described as crystalline contains more than one crystalline species, as well as non-crystalline material, consequently the melting point is not sharp.

The product is distilled either at atmospheric pressure or under reduced pressure. If the distillation is carried out at atmospheric pressure, it should be rapidly distilled in order to obtain a good yield. The distilled product is a light yellow, opaque solid when crystalline, and clear when non-crystalline, due to extremely rapid cooling. When crystalline, the freezing range is from 171° C. to 127° C.; while the density is 1.75 at 28° C./28° C.

*Example V*

Mix together 6 pounds of molten technical diphenyl (Fraction 1 of Table 1) and 4 pounds of molten distilled high boiling compounds. (Fraction 2 of Table 1.) Chlorinate as in Example 1 until the product on analysis is found to contain 63.47 per cent of chlorine. The softening point will be approximately 78.5° C., and the material will be a black, non-crystalline body, somewhat sticky at room temperature. This product is distilled preferably at reduced pressure. The softening point of the products obtained where from 50% to 95% of the chlorinated material is distilled in this way is given in Figure 1. The products from this distillation are clear-yellow to colorless, non-crystalline resins somewhat sticky at ordinary temperatures.

*Example VI*

Mix together the raw materials mentioned in Example V above and chlorinate as in Example 1 to 64.81% chlorine instead of to 63.47%. On distilling under reduced pressure, the product which originally had a softening point of 86° C., one may obtain materials having softening points as given in Figure 2, by stopping distillation at any of the percentages given. The products from this distillation are clear to opaque resins, being non-crystalline when above 64% is distilled over, while at lower percentages they have a tendency to crystallize. The crystalline material tends to become opaque, while the non-crystalline material as obtained on quickly cooling is clear and yellow to colorless.

*Example VII*

Mix together 8 pounds of molten technical diphenyl (Fraction 1 of Table 1) and 2 pounds of distilled molten high boiling compounds (Fraction 2 of Table 1) and chlorinate as in Example 1 to a 63.47% chlorine content. The material has a softening point of 67° C. On distilling over various percentages of the product under reduced pressure, one obtains a range of products having the softening points given by the curve in Fig. 3. The products from this distillation are clear, yellow to colorless non-crystalline resins.

*Example VIII*

Mix together 6 pounds of molten technical diphenyl (Fraction 1 of Table 1), 3.2 pounds of molten distilled high boiling compounds (Fraction 2 of Table 1), and 0.8 pounds of still bottoms (Fraction 3 of Table 1) and chlorinate as in Example 1 to a 64.79% chlorine content. The softening point of this chlorinated product is found to be 102° C. On distilling over various percentages of the product under reduced pressure, one obtains a range of products having the softening points given by the curve in Fig. 4.

The materials from this distillation are light yellow to colorless clear resins, being somewhat brittle at ordinary temperatures.

In determining the crystalline tendency, we have found the following test to be of value:

For the heavier resins, heat the distilled resin in a glass beaker to 100°–105° C. for twenty-four hours in a suitable oven in the presence of seed crystals. The seed crystals are obtained by chlorinating technical diphenyl to a chlorine content of 68%. Allow to cool, and if the material is crystalline, small needle-shaped crystals appear in the body of the material which becomes opaque. These crystals are absent if the material is truly non-crystalline.

For the soft resins, a lower temperature may be advantageously employed for the crystallization test. For the material described in Example III above, a temperature of 45° C. is recommended.

It should also be pointed out that the chlorine content—softening point relation given in the above examples are the actual results of small scale chlorinations. We have found that when carrying out the chlorination in the factory, making batches weighing from 4,000 to 9,000 pounds, the softening point is in general somewhat lower than that given in the above examples. We have found it to vary as much as from 6° to 25° lower, depending upon the particular mixture of diaryls being chlorinated. Hence, it is necessary that the chlorine-content-softening-point relation be re-established when working with larger batches. This, however, is a simple matter to one skilled in the art.

As has already been indicated in the above specific examples, we have found that when the proportions of complex high boiling compounds are much greater than those usually found in technical diphenyl, such as is described as Fraction 1 of Table 1, it is desirable to distill under reduced pressure, since it is difficult to vaporize the more complex high boiling compounds after having been highly chlorinated. This is especially true of those mixtures which have been described and which contain from 20 to 40% of complex high boiling compounds.

The several specific examples given above illustrate the possibilities of our discovery in the production of resins of varying properties. As has already been pointed out, the size of the batch being chlorinated has some effect on the softening point-chlorine content relation. Consequently, this effect should be kept in mind when operating with varying sized batches of material. Hence, while the relationships indicated by the following examples and curves are qualitatively correct, they should not be relied upon for quantitative relationships unless the same quantities of material are used as given in the examples, in which case they should be readily duplicated.

By way of summarizing our findings, we desire to point out the following relationships, some of which are readily apparent from the results already discussed.

1.—In general, it can be said that the greater the yield on distillation of the chlorinated distilled diaryls, the greater the complexity of the distilled product. This results in the higher softening point and the lower crystallizing tendency in the case of the chlorinated diaryls which are solid at ordinary temperature; and the higher viscosity of the chlorinated diaryls which are liquid at ordinary temperature, as the yield on distillation increases. In the case of the solid chlorinated distilled diaryls, this relationship is expressed by curves shown in Figs. 1 to 3.

2.—In general, it can be said that in the case of the products solid at ordinary temperatures, the higher the final chlorine content of the chlorinated mixture of diaryls before distillation, the higher the softening point, and the greater the crystallizing tendency of the distilled product. This is illustrated by the curves in Figs. 1 and 2, in which a mixture of diaryls chlorinated to 63.47% chlorine gave a resin having a softening point of 75.5° C. It will also be noted that while in the case of the lower chlorinated product, all products were non-crystalline after distillation in the case of the higher chlorinated product only those products distilled to a yield above 64% were non-crystalline. When dealing with chlorinated diaryls, liquid at ordinary temperatures, it is found that a high chlorine content of the product before distillation yields a more viscous product after distillation.

3.—In general, it can be said that in the case of the products which are solid at ordinary temperatures, the higher the proportion of complex high boiling compounds to diphenyl in the mixture before chlorination, the higher the softening point and the less the crystallizing tendency of the chlorinated resin after distillation. The first of these relations is illustrated by the curves in Figs. 1 and 3. It will be noted that a product made up of 40% distilled high boiling compounds and 60% of technical diphenyl and chlorinated to 63.47% chlorine on distilling to give an 80% yield, yielded a resin having a softening point of 67° C., whereas, when the resin was made from 20% distilled high boiling compounds and 80% technical diphenyl chlorinated to 63.47% chlorine on distillation to an 80% yield gave a resin having a softening point of only 55.6° C.

In the case of mixtures of diphenyl with much smaller amounts of distilled high boiling compounds, for example when chlorinating technical diphenyl alone (Fraction 1 of Table 1) which contains 1 to 4% of high boiling compounds to a 64% chlorine content, we obtain a resin which is sufficiently mobile so that a viscosity determination of 210° F.

may be made. This product is described in Example III above.

4.—In general, it can be said that the higher the boiling point of the complex high boiling compounds mixed with diphenyl in the mixture to be chlorinated, the higher the softening point of the distilled product. This is apparent when comparing the curves in Figs. 2 and 4. In the latter case it will be noted that 8% of the material chlorinated is made up of a very high boiling fraction (Fraction 3 of Table 1 while in the former case the high boiling compounds are entirely made up from Fraction 2 of Table 1. In small batches such as described in Example VIII, we have found the crystalline tendency to be as given in the curve in Fig. 4.

While we have shown our invention in several forms, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. Process of producing light colored resins of the chlorinated diaryl type, comprising chlorinating diphenyl together with other diaryls and distilling the chlorinated product.

2. Process of producing light colored resins of the chlorinated diaryl type, comprising chlorinating diaryls to a chlorine content up to 68% and distilling the chlorinated products.

3. In a process of producing resins of the chlorinated diaryl type in which diaryls are chlorinated, the step of clarifying said product which consists in distilling.

4. Process of producing light colored resins of the chlorinated diaryl type, comprising chlorinating a mixture of diphenyl and complex diaryls having a boiling range of 270° to 400° C. and distilling the chlorinated mixture.

5. Process of producing light colored resins of the chlorinated diaryl type comprising chlorinating up to a chlorine content of 68% a mixture of diphenyl and complex diaryls having a boiling range of 270° to 400° C. and distilling the chlorinated mixture.

6. In the process of producing light colored resins of the chlorinated diaryl type comprising mixing diphenyl and complex diaryls having a boiling range of 270° to 400° C., chlorinating the mixture, and then distilling, the step of varying the proportions of diphenyl to the complex diaryls, thereby varying the softening point of the product.

7. In the process of producing light colored resins of the chlorinated diaryl type comprising mixing diphenyl and complex diaryls having a boiling range of 270° to 400° C., chlorinating the mixture, and then distilling, the step of varying the percentage of the product distilled over to vary the softening point of the product.

8. In the process of producing light colored resins of the chlorinated diaryl type comprising mixing diphenyl and complex diaryls having a boiling range of 270° to 400° C., chlorinating the mixture, and then distilling, the steps of varying the proportions of diphenyl to the complex high boiling compounds and distilling over varying percentages of the chlorinated product to vary the softening point thereof.

9. In the process of producing light colored resins of the chlorinated diaryl type from chlorinated diaryls, the step comprising distilling over varying percentages of the chlorinated diaryls.

10. A process of producing a light colored chlorinated diaryl resin and controlling the softening point thereof which consists in chlorinating the diaryl to a chlorine content up to 68%, thereby producing a relatively dark colored substance having a relatively high softening point, and distilling over a part of said substance to obtain a light colored product having a relatively lower softening point.

11. A light colored oil having a density greater then 1.3 at 65°/65° and comprising principally chlorinated diphenyl.

12. A light colored resin comprising principally chlorinated diphenyl and other chlorinated diaryls.

13. A light colored oil comprising principally chlorinated diphenyl, said oil being a yellow to colorless, clear to opaque body, and having a density greater than 1.3 at 65°/65°.

14. A light colored resin comprising principally chlorinated diphenyl and other chlorinated diaryls, said resin being a yellow to colorless, clear to opaque body.

In testimony whereof we affix our signatures.

RUSSELL L. JENKINS.
JOSEPH A. SIKARSKI.